O. C. WYSONG.
BAND PULLEY.
APPLICATION FILED MAR. 9, 1908.

918,248.

Patented Apr. 13, 1909.

Witnesses
Walter F. Murray
Agnes McCormack

Inventor
Olmedo Cortez Wysong.
By C. W. Miles,
Attorney

UNITED STATES PATENT OFFICE.

OLMEDO CORTEZ WYSONG, OF GREENSBORO, NORTH CAROLINA.

BAND-PULLEY.

No. 918,248.     Specification of Letters Patent.     Patented April 13, 1909.

Application filed March 9, 1908. Serial No. 419,930.

*To all whom it may concern:*

Be it known that I, OLMEDO CORTEZ WYSONG, a citizen of the United States, residing at Greensboro, in the county of Guilford and State of North Carolina, have invented certain new and useful Improvements in Band-Pulleys, of which the following is a specification.

My invention relates to improvements in pulleys for wood working machinery.

One of its objects is to provide a pulley for use on band saws to enable a single machine to be used both as a band re-saw and as a scroll saw.

Another object is to provide a pulley having a rigid or all metal tread or working face for very wide band saws; and other wood working bands and a yielding or rubber face for very narrow band saws, and other wood working bands and also to provide for retaining the rubber in place on the pulley and to prevent air getting beneath the rubber.

Figure 1:
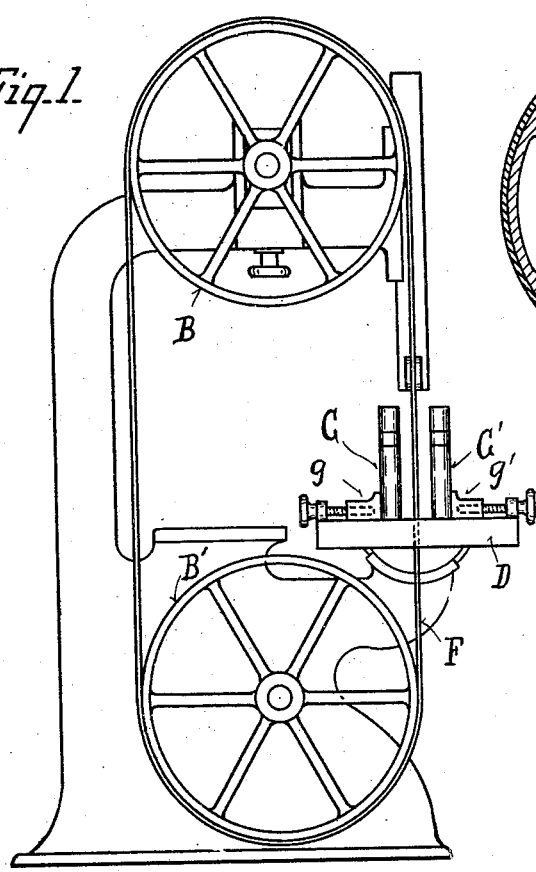
Figure 2:
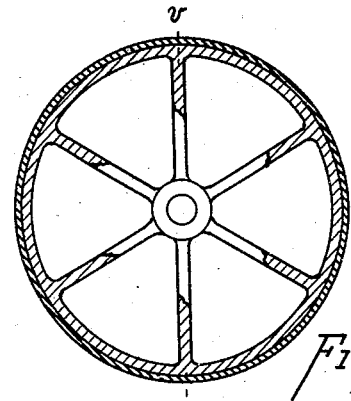
Figure 3:
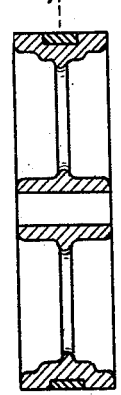
Figure 4:
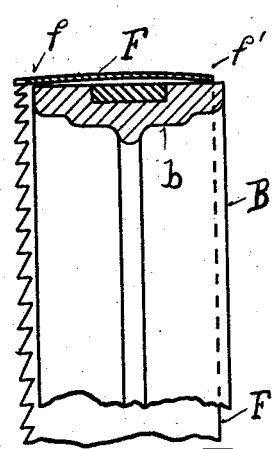
Figure 5:
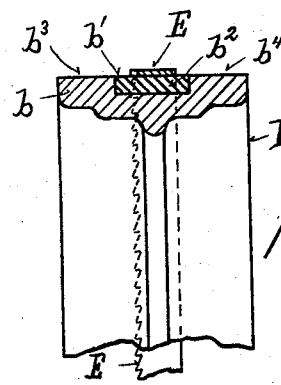

It further consists in certain details of form, combination and arrangement, all of which will be more fully set forth in the description of the accompanying drawings, in which:

Figure 1 is a front elevation of a band saw mechanism embodying my improvements. Fig. 2 is a section through one of my improved band pulleys on line $x$—$x$ of Fig. 3. Fig. 3 is a section through the same on line $v$—$v$ of Fig. 2. Fig. 4 is an enlarged sectional detail view showing the position of a wide band saw on the pulley in position for use. Fig. 5 is an enlarged sectional detail view showing a narrow band saw on the pulley in position for use.

Band scroll sawing and band re-sawing operations have heretofore required separate and different machines for their performance. By means of the mechanism herein specified I am enabled to successfully perform both operations upon one machine.

In the accompanying drawings A represents the frame of a band saw. B, B' the pulleys which support and tension the band saws, and D the table upon which the work is supported. The frame and table may be the same as heretofore in use for either operation.

The operation of re-sawing, that is severing one thick board or timber into two or more thinner ones of equal width, is performed by means of a wide band saw E which in the unstrained condition is not flat or straight in cross section but curved as indicated in Fig. 4, and under working strain attains a straight or nearly straight cross section. This necessitates a heavy working strain on the band saw, and an unyielding pulley tread or contact face for the band saw to travel on. For the operation of scroll sawing a very narrow band saw is required, and in order to prevent injury to the teeth thereof it is necessary to provide a yielding tread or contact face for the band to travel on. In order to meet the conditions and carry out both operations upon one machine I provide band pulleys having wide, strong and heavy rims $b$ which are centrally recessed at $b'$ said recess being filled, or nearly filled with a yielding tire $b^2$ preferably of rubber, which by reason of its position in the groove is readily retained in place, and prevents air getting beneath the rubber tire in operation, which has a tendency to strip the tire from the pulley. The rubber tire serves as a tread or working face for narrow scroll saws E. The shape of the pulley rims are such as to leave wide, strong, metal treads $b^3$, $b^4$ on opposite sides of the rubber tread $b^2$. When used for re-sawing the wide band saw F is adjusted so that its opposite edges $f$, $f'$ engage and travel upon the metal treads $b^3$, $b^4$, while the teeth of the saw overhang the forward edge of the pulley so as not to be injured by contact with the metal face of the pulley. In the re-sawing operation rollers G, G' journaled in brackets $g$, $g'$ are adjustably secured to the table to hold the work straight and in position during the operation. A separate table provided with rollers G, G' may be interchanged with a plain topped table D if desired. Pulleys of the character above described may also be used to advantage in supporting and driving other wood working bands, for instance abrasive bands, in which case wide bands will travel without slipping upon the metal treads $b^3$, $b^4$, while narrow bands which would slip upon the metal tread, will travel without slipping upon the rubber tire $b^2$, and I am thus enabled to provide inexpensive and durable pulleys suited to the requirements of the several bands employed.

Having described my invention, what I claim is;

1. In a band carrying wood working machine, a pair of pulleys adapted to support, tension and drive a variety of bands of substantially different widths, said pulleys being characterized by having two broad metal treads at opposite sides of the pulley face and a central yielding tread secured by forming a recess of rectangular cross section in the central portion of the pulley face and inserting a flat tire of resilient material in said recess.

2. In a mechanism of the character indicated, a yoke shaped frame, a work supporting table located in the opening between the arms of said yoke frame, a pair of band pulleys journaled in opposite ends of said yoke frame, one of said pulleys being mounted in adjustable bearings to vary the distance between said pulleys, said pulleys having metal treads at opposite sides of the pulley face and a flat yielding tread formed by recessing the central portion of said pulley faces and inserting flat faced tires of resilient material.

3. In a band carrying machine, a pair of pulleys adapted to support, tension and drive a variety of different bands of substantially different widths, said pulleys being characterized by having two metal treads at opposite sides of the pulley face to jointly support and drive wide bands said treads being formed as integral parts with the balance of the pulleys, and a central resilient tread secured by recessing the pulley rims and inserting resilient tires having a flat face in said recesses, to support and drive narrow bands.

4. The method of using band saws of substantially different widths, which consists in providing a band saw machine with band pulleys having two metal treads at opposite sides of the pulley faces and central yielding treads formed by recessing the central portion of the pulley faces and inserting tires of resilient material, and interchangeably employing the wider band to travel upon said metal treads with the teeth overhanging one edge of the pulleys, and applying the smaller bands to the intermediate resilient surface of the pulleys.

5. The combination for interchangeable use with two bands of substantially different widths of a pair of band pulleys having metal treads at opposite sides of the pulley faces, and a central yielding tread formed by recessing the central portion of the pulley faces and inserting a tire of resilient material, and interchangeably using the wider band to travel upon said metal treads, and the narrower band to travel upon the intermediate resilient tread.

In testimony whereof I have affixed my signature in presence of two witnesses.

OLMEDO CORTEZ WYSONG.

Witnesses:
  P. D. KERNER,
  J. A. KLEEMEIER.